US005924571A

United States Patent [19]

[11] Patent Number: 5,924,571
[45] Date of Patent: Jul. 20, 1999

Cornelissen

[54] RECLOSABLE FILM PACKAGE

[75] Inventor: Herman Cornelissen, Aartselaar, Belgium

[73] Assignee: Agfa-Gevaert, Mortsel, Belgium

[21] Appl. No.: 09/023,797

[22] Filed: Feb. 13, 1998

Related U.S. Application Data

[60] Provisional application No. 60/042,069, Mar. 26, 1997.

[30] Foreign Application Priority Data

Feb. 15, 1997 [EP] European Pat. Off. .............. 97200444

[51] Int. Cl.$^{6}$ .............. G03B 42/04

[52] U.S. Cl. .............. 206/455; 229/152; 378/184; 378/188

[58] Field of Search .............. 229/152, 153, 229/223; 206/455; 378/182, 184, 188

[56] References Cited

U.S. PATENT DOCUMENTS

| | | | |
|---|---|---|---|
| 2,178,162 | 10/1939 | Callmander | 229/152 |
| 3,392,901 | 7/1968 | Krzyzanowski | 229/223 X |
| 3,443,093 | 5/1969 | Lindenmuth et al. | 206/455 X |
| 3,741,386 | 6/1973 | Schmidt | 206/455 |
| 4,174,041 | 11/1979 | Turner | 229/152 X |
| 5,139,148 | 8/1992 | Peeters et al. | 206/455 |
| 5,156,331 | 10/1992 | Pirre . | |
| 5,377,835 | 1/1995 | Cornelissen et al. | 206/455 |
| 5,511,722 | 4/1996 | Dixon . | |

FOREIGN PATENT DOCUMENTS

| | | |
|---|---|---|
| 0519122 | 12/1992 | European Pat. Off. . |
| 3838459 | 5/1990 | Germany . |

*Primary Examiner*—Bryon P. Gehman
*Attorney, Agent, or Firm*—Baker & Botts, L.L.P.

[57] ABSTRACT

A reclosable film package consisting of a filmpack (17) and a rectangular tuck-end carton (10) enclosing the filmpack and having a top opening (13) closable by means of a top flap (14) having a flap extension (15) which can be tucked into the body of the carton, the flap extension (15) having a tapered form, and the front wall (27) of the carton having near its top end provisions allowing controlled removal of a tapered top portion of the wall to provide a tapered opening (12) allowing the flap extension to become engaged underneath the front wall (27).

14 Claims, 4 Drawing Sheets

RECLOSABLE FILM PACKAGE

This Application claims the benefit of U.S. Provisional application No. 60/042,069 filed Mar. 26, 1997.

BACKGROUND OF THE INVENTION

1. Field of the Invention

The present invention relates to a reclosable film package for a stack of photographic sheets, in particular for medical X-ray films.

2. Description of the Prior Art

Medical X-ray film sheets that require a darkroom for their loading in an X-ray film cassette for their exposure, or in the magazine of a daylight loader for automatic reloading of a cassette as an image-wise exposed film has been removed therefrom, are packed in different forms.

One package form comprises a stack of film sheets wrapped in a light-tight and moisture-tight bag that can be torn open in a controlled way. The bag is contained in a telescope-type carton comprising an inner carton in the form of an open rectangular holder and a two-part outer carton, the lower part fitting in the inner carton and the upper part forming a cover that telescopes over the protruding part of the inner carton. The described carton allows the light-tight storage of the film once the bag has been opened, but is costly to manufacture.

Another package form comprises a stack of film sheets wrapped in a light-tight bag with an exit extension folded back on the stack and light-tightly closed near its free end, and a tuck-end carton enclosing said stack and having a top opening closable by means of a top flap hingedly connected to an edge of said opening and being provided with a flap extension that can be tucked into the body of the carton.

At first use of the package, the user opens the top panel and removes the filmpack at least partly from the carton. He opens (in the darkroom) the light-tight seal of the bag and takes out the required number of film sheets for loading a cassette or a film magazine. Next he folds back the flap of the bag to seal the contents thereof against light and then re-inserts the bag into the carton to keep the bag backfolded. Next he closes the carton flap for further enclosing the filmpack. The described package is disclosed in U.S. Pat. No. 5,377,835 (Cornellissen et al., 1995).

A difficulty with the described package is the reinsertion of the filmpack in the carton, the backfolded extension of the wrapping bag having to be advanced simultaneously with the filmpack in order not to leave an uninserted flap portion as the filmpack itself has been completely inserted in the carton. The latter situation can leave doubts on the satisfactory light-tightness of the package, and it also can prevent a complete closing of the flap of the carton.

SUMMARY OF THE INVENTION

1. Object of the Invention

It is the object of the present invention to provide a film package of the type referred to, which is more convenient to unload and to reclose.

2. Statement of the Invention

In accordance with the present invention, a reclosable film package comprising a filmpack formed by a stack of film sheets wrapped in a flexible light-tight wrapper with an exit extension folded back on the pack and a rectangular tuck-end carton enclosing said filmpack and having a rear wall, a front wall, a bottom wall, opposite side walls, and a top opening closable by means of a flap hingedly connected to the rear wall, said flap having a flap extension which can be tucked into the body of the carton, is characterised in that the front wall of said carton has near its top end provisions allowing controlled removal of a top portion of said wall to leave an opening uncovering at least partly the backfolded wrapper extension, and that said flap extension has a size such that it is capable of moving in its tucked-in position underneath at least one edge of said opening left in said front wall, thereby to remain clamped underneath said front wall of said carton.

The described wall opening of the carton can offer a large access for the operator to keep the backfolded extension of the wrapper onto the film pack while he recloses the carton flap. The length of the backfolded extension of the wrapper may be so great that the top end thereof can be engaged between the front wall of the carton and the corresponding face of the film pack, but this backfolded extension may also have a smaller length so that its top end does not become engaged. This latter embodiment is not detrimental to the light-tightness of a reclosed film package and may be easier to manipulate.

Suitable embodiments of the present invention are as follows.

The flap extension and the front wall opening both may have a trapezoid shape.

The flap extension may have at least one crease allowing its inward folding to facilitate its tucking into the body of the carton. Further, the flap extension may have a crease determining a base section of a size generally equal to that of said flap.

The film package may be arranged in such a way that the flap extension approximately starts to enter underneath the edges of the opening in the front wall as the flap takes a position lying in the plane of the rear wall while the adjacent base portion of the flap extension is taking a position approximately normal thereto.

This allows the closing of the carton without notable bending of the flap extension during its insertion in the carton. This aspect is important since a carton of the described type is usually made of corrugated cardboard and suchlike material does not tolerate excessive bending without getting permanently distorted.

The tapering of the flap extension may be less than that of the opening in the front wall of the carton. This offers the advantage that the edges of the flap extension and of the wall opening progressively engage each other as the carton is closed so that less skill is required from the user to handle the carton.

The length of the flap extension amounts to at least one time the length of the flap itself, but may also be and even suitably is, at least three times larger than such flap length.

The carton of the inventive film package is preferably a one-piece wrap-around carton formed in situ around the filmpack. To that end, an appropriately creased and cut blank of corrugated board or the like may be used, comprising a rear panel having on opposite sides thereof side panels connected along fold lines, a bottom panel connected along fold lines with the rear and front panel respectively, a front panel having on opposite sides side panels connected along fold lines, and a top panel connected along a fold line with the rear panel. The described blank is placed on a transport belt or the like and the film pack is put on the rear panel. Next the top panel, i.e. the flap of the carton, is folded against the film pack, an extension of the top panel becoming located on the front side of the film pack, and then the front panel is folded over the filmpack whereby the bottom panel becomes applied against the bottom of the filmpack and the flap extension of the top panel is clamped between the front panel and the filmpack. Finally, the corresponding side panels are folded towards each other and adhesively bonded together. After the glueing of the carton as described, it is quasi impossible to open the package without removal of the top portion from the front wall.

BRIEF DESCRIPTION OF THE DRAWINGS

The invention will be described hereinafter by way of example with reference to the accompanying drawings wherein:

FIGS. 1 and 2*a* show one embodiment of a reclosable film package according to the invention.

Figure 1:
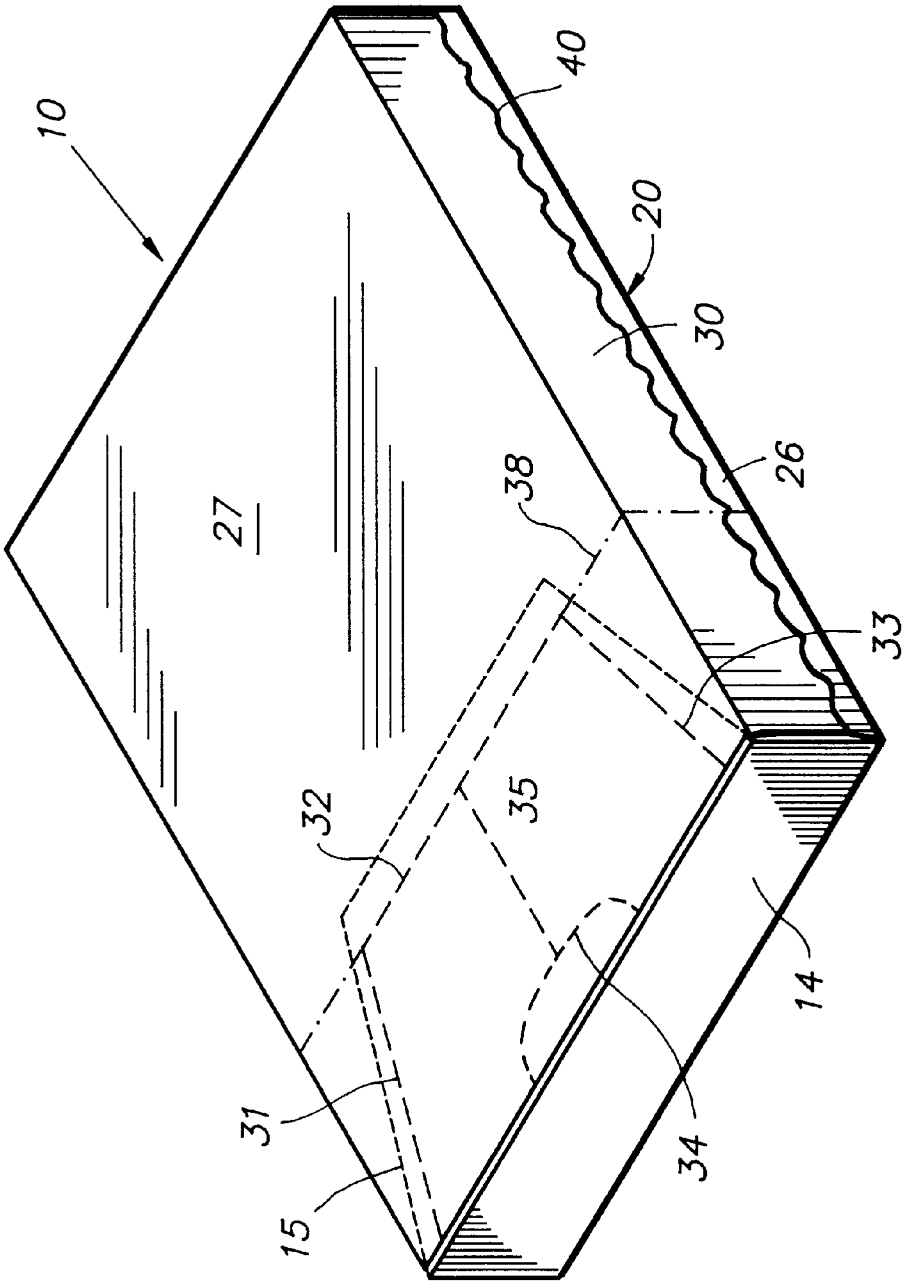
FIG. 1 is an isometric view of one embodiment of a package according to the invention.

Rectangular carton 10 is made from a one piece appropriately cut and creased blank of corrugated paperboard, and has a top opening 13 closable by a flap 14 with a flap extension 15, shown in small dashed lines in FIG. 1. Flap 14 is hingedly connected to the carton. The enclosed film pack 17 is wrapped in a light-tight bag with a flap-like extension 18 folded back on the pack as shown and secured thereto by a label 19 or the like. The exit end of the folded extension is light-tightly closed, preferably by means of a peelable seal. Suitable materials for the bag are black pigmented polyethylene, polypropylene, etc., either in the form of a single layer or in the form of a laminate of different layers with different mechanical, protective, and/or sealable properties. Flap 14 and flap extension 15 are integral with rear wall 20 of the carton, a first crease 21 forming a hinge between flap 14 and this rear wall, a second crease 23 forming a hinge between flap 14 and flap extension 15, and a third crease 24 forming a fold line determining a base section 15' and a top section 15" of flap extension 15. The length l' of flap extension 15 may be at least equal to the length l of flap 14, but suitably is at least three times as great as the such length l.

The folding of the carton blank to constitute the illustrated carton is as follows. Film pack 17 is put on rear panel 20 of the blank, side panels 25 and 26 are folded upwardly, flap 14 and flap extension 15 are folded on the film pack, rear panel 28 and front panel 27 are folded to engage the bottom and front side respectively of the filmpack, and finally side panels 29 and 30 of front panel 27 are folded downwardly and adhered, e.g. by means of a hot-melt adhesive, to corresponding side panels 25 and 26.

All these operations are common in the art and need therefore no further explanation. The EP application mentioned hereinbefore shows the folding of the distinct panels of a similar package in more detail. Finally, it should be noted that the free edge of the outer side panels 29 and 30, see e.g. edge 40, has been cut according to a fluted instead of to a straight cutting line, and also does not extend completely up to the adjacent edge of the rear wall of the carton, in order to reduce the risk for injury of one's fingers by such cut edge during manipulation of the package.

Front panel 27 of the carton has near its top end provisions allowing controlled removal of a top section 39 of this panel to form e.g. a trapezoid opening in said panel. These provisions are formed in the present embodiment by lines of perforations shown in relatively large dashed lines in FIG. 1, and they comprise lines 31, 32 and 33, respectively. Gripping of this section near its free edge allows to easily remove it from wall 27, thereby leaving an opening 12 as shown in FIG. 2*a* which gives a wide access to the underlying backfolded extension of the film pack.

Figures 2A, 2B:
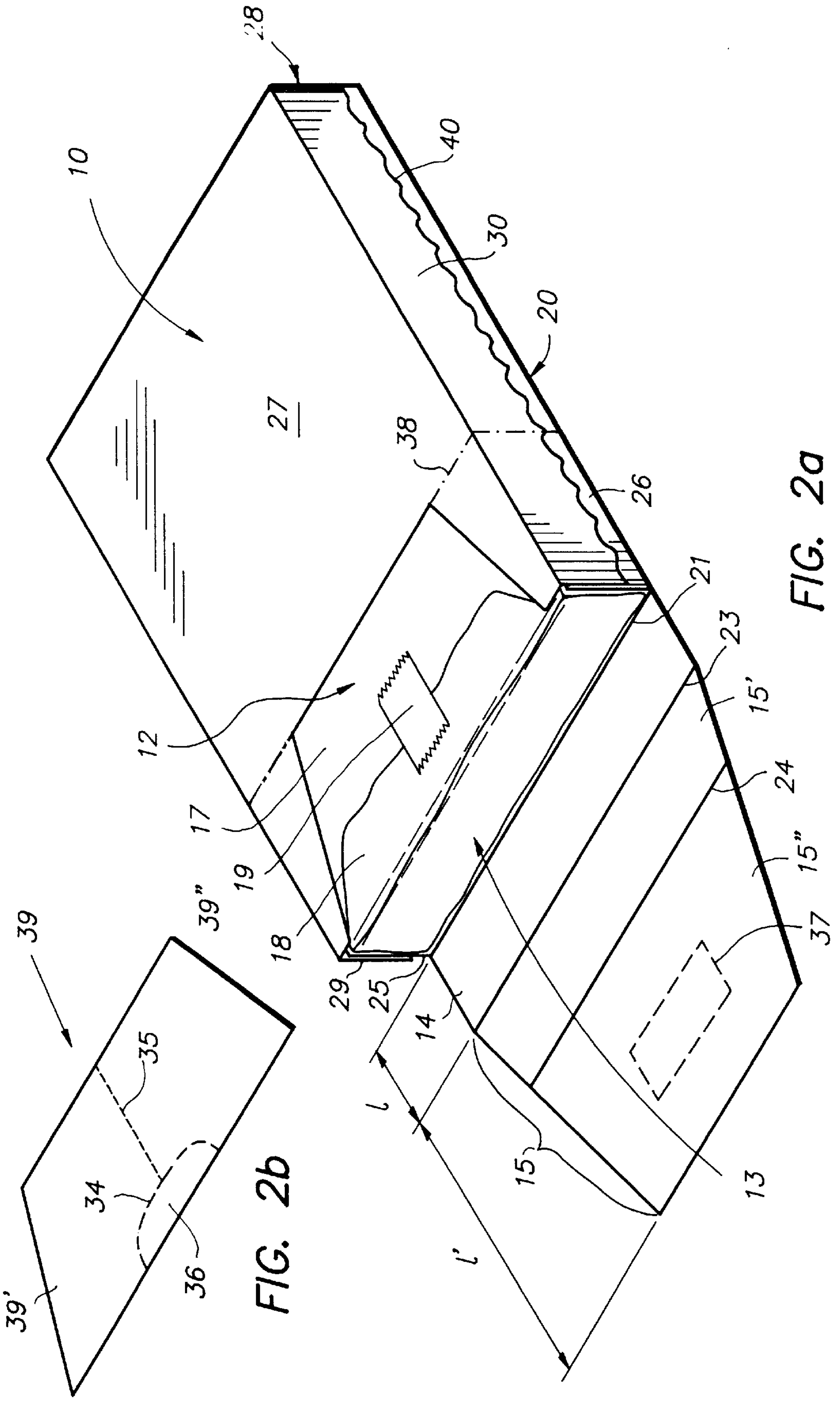
FIG. 2*a* is an isometric view of the package of FIG. 1, its flap being opened.
FIG. 2*b* shows a removed wall section of the package according to FIG. 2*a,*

Removed wall portion 39 has been shown for greater clarity in FIG. 2*b*. The removal of this wall portion is facilitated by provisions such as perforated lines 34 and 35. Line 34 delimitates a small tab 36 which can easily be broken away to give finger access under subportions 39' and 39" so that perforation 35 can be broken and further removal of these portions is easy.

Then flap 14 is opened, seal 19 broken, wrapper extension 18 unfolded, after which the wrapped film sheets can be taken out from their wrapper. In this connection it should be understood that the length of wrapper extension 18 may as well be larger than the illustration in the figure, so that it may be clamped with its exit end underneath front wall 27.

For reclosing the package, the operator folds back extension 18 on the film pack and, as the case may be, re-inserts its end under wall 27.

Figure 3:
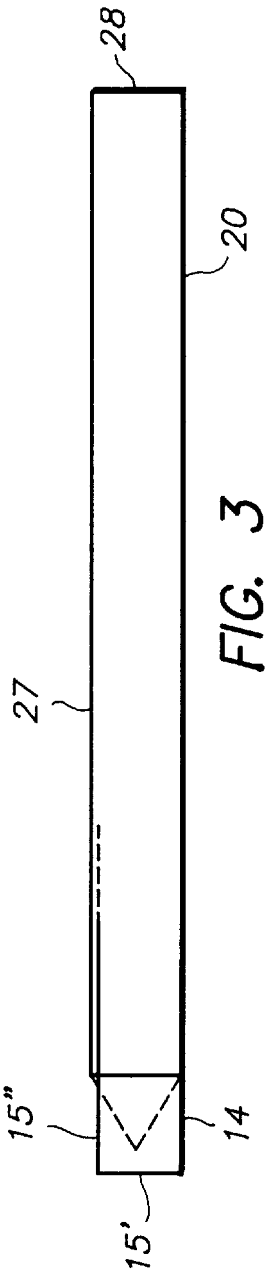
FIG. 3 is a diagrammatic longitudinal sectional view showing the closing of the package.
Figure 4:
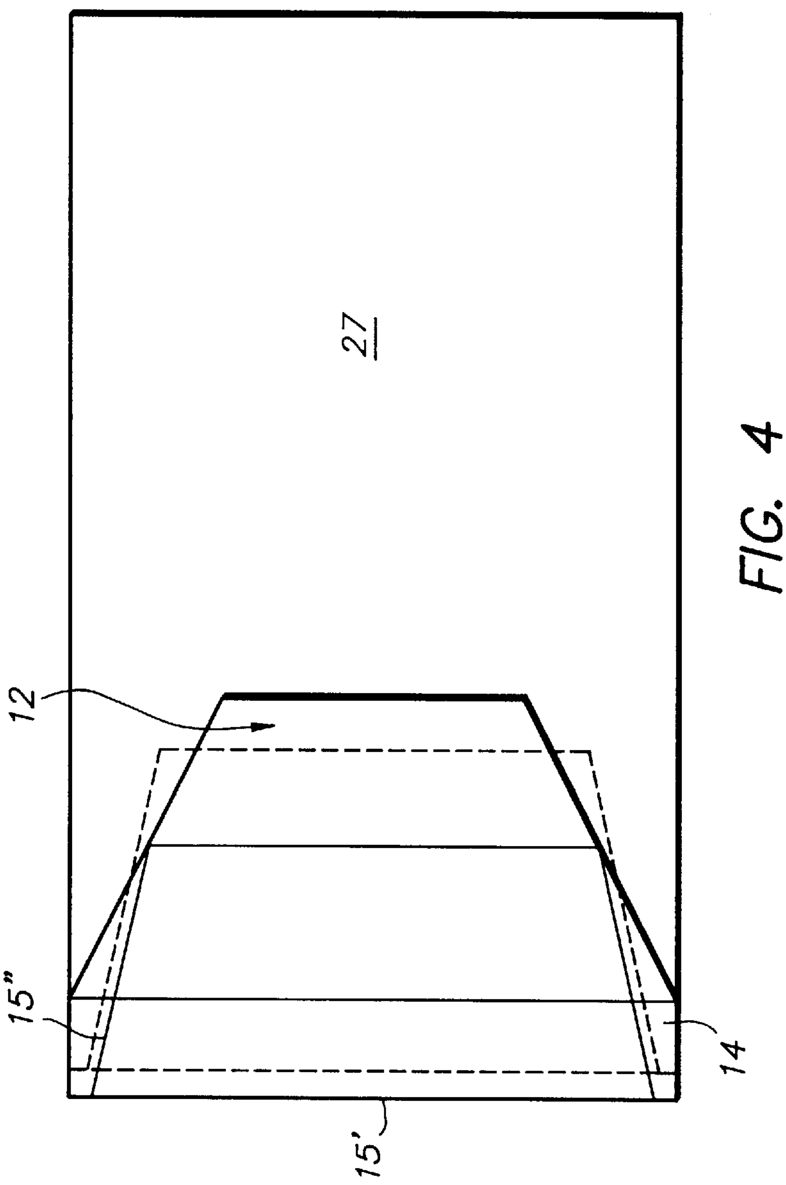
FIG. 4 is a diagrammatic plan view of such closing.

Then flap extension 15' is folded approximately normal to flap 14 which itself lies approximately in the plane of rear wall 20 while flap extension 15" lies just underneath front wall 27, see the diagrammatic illustration of FIG. 3. A plan view of this situation is shown in FIG. 4 and it is clear that, because the tapering of flap section 15 " is smaller than that of opening 12 in front wall 27, flap extension 15" will first engage the lateral edges of said opening with its two frontal corners. As the flap extension is further pushed underneath wall 27, the lateral edges of the flap will progressively and smoothly engage the corresponding edges of opening 12. The dashed lines in FIGS. 3 and 4 show an intermediate position of flap 14 and flap extensions 15' and 15".

Flap extension 15" of the described carton may, if desired, be provided at its innerside with a patch 37 of contact adhesive, see FIG. 2*a,* allowing the opened extension 18 of bag 17 to become adhered thereto. This causes the opening of this bag 17 as the carton is opened.

The described carton may be provided with a circumferential, weakened line such as 38, e.g. a line of perforations, allowing the easy removal of the entire top portion from the carton. The shell thus remaining can form a handy holder for keeping films in a light-tight bin or the like in a darkroom.

Line 38 can coincide with base perforation line 32 of opening 12 in wall 27.

The carton of the reclosable film package according to the invention is not limited to a one-piece contruction, but may e.g. be manufactured from two mating trays in case no wrap-around technique is used.

The carton can be made from fibre or polymer board, either corrugated or not. The board may be foil-lined to afford protection as well as particular display effects.

Figure 5:
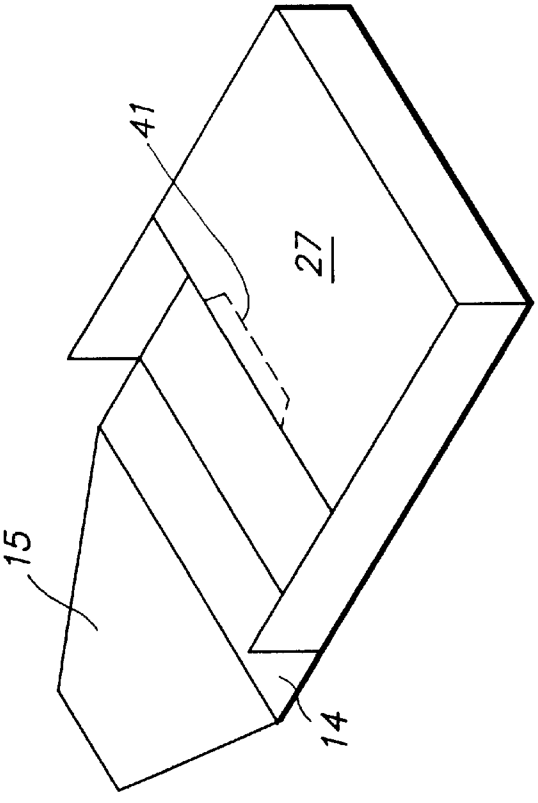
FIG. 5 is a diamgrammatic isometric view of a second embodiment of a package according to the invention.

FIG. 5 shows a second embodiment of a package according to the invention, the film pack being omitted. The package has been shown in its opened position, the top portion of front wall 27 being already removed. Contrary to the first embodiment, this removed portion has a square shape covering the complete width of the carton, so that tapered flap extension 15 leaves two triangular side openings as the carton is closed flap 14 is closed, the top end of the closed flap extension being clamped underneath front wall 27 as shown in dashed lines 41.

Figure 6:
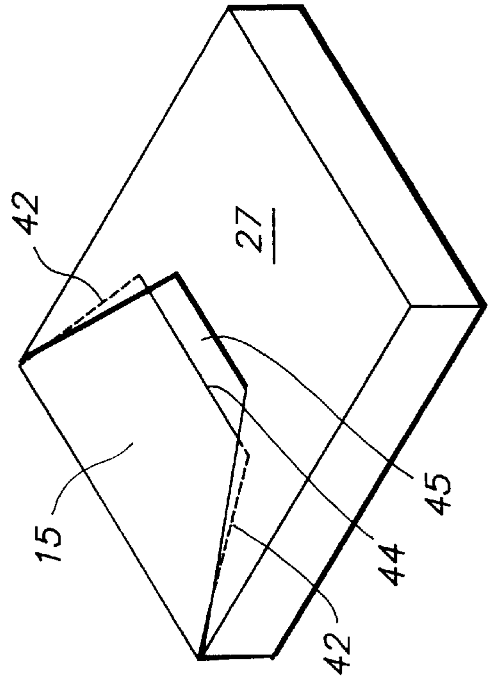
FIG. 6 is a diagrammatic isometric view of a third embodiment of a package according to the invention.

FIG. 6 shows a third embodiment of a package according to the invention, the package being shown reclosed after its first opening. The trapezoid top portion of front wall 27 has been removed, and flap extension 15 is clamped with its lateral sides underneath front wall 27 as shown in dashed lines 42. Front edge 44 of flap extension 15 does not reach up to the bottom of the opening in wall 27 so that a space 45 is left, which is not detrimental to the lighttightness of the reclosed package.

Figure 7:
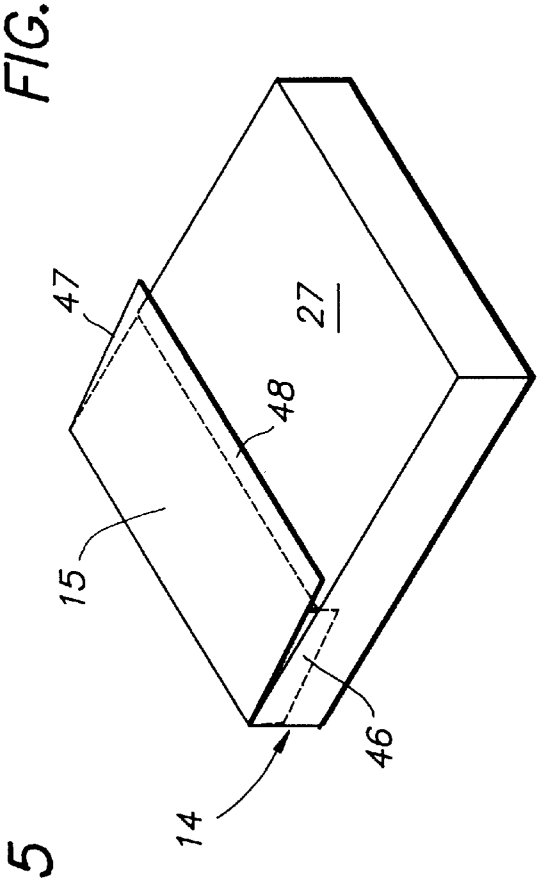
FIG. 7 is a fourth embodiment of a package according to the invention.

FIG. 7 shows a fourth embodiment of a package according to the invention, this package likewise being shown in its reclosed position. This package has a flap extension 15 with two side flaps 46 and 47 which fit between the carton side walls and the filmpack. They do not allow bending of flap extension 15 upon opening and reclosing of the film package, but such bending is not required in the present embodiment since the flap extension extends only with a small top margin 48 underneath front wall 27 so that in fact flap 14 has to be withdrawn only slightly, say over a distance from 1 to 3 cm, to set free the flap extension. For the sake of clarity, top margin 48 of flap extension 15 has been shown as being on top of rather than underneath wall 27.

| Parts list: | |
|---|---|
| 10 | carton |
| 12 | wall opening |
| 13 | top opening |
| 14 | flap |
| 15 | flap extension |
| 17 | film pack |
| 18 | extension of film pack |
| 19 | label |
| 21,23,24 | creases |
| 25,26,29,30 | side panels |
| 27 | front panel |
| 28 | rear panel |
| 31,32,33,34,35 | perforations |
| 36 | tab |
| 37 | adhesive patch |
| 38 | perforations |
| 39 | removable top section |
| 40 | cut edge |
| 41 | top end of flap extension |
| 42 | lateral edges of flap extension |
| 44 | front edge of flap extension |
| 45 | open space |
| 46,47 | side flaps |
| 48 | top margin of flap extension. |

I claim:

1. A reclosable film package comprising a filmpack formed by a stack of film sheets wrapped in a flexible light-tight wrapper with an exit extension folded back on the filmpack and a rectangular tuck-end carton enclosing said filmpack and having a rear wall, a front wall, a bottom wall, opposite side walls, and a top opening closable by means of a flap hingedly connected to the rear wall, said flap having a length 1, a flap extension which can be tucked into the body of the carton, said flap extension having a length 1' wherein the front wall of said carton has provisions allowing controlled removal of a portion of said front wall adjacent said top opening for initially opening said reclosable film package to form a front wall opening having a size large enough for uncovering at least partly the backfolded exit extension; and said flap extension has a size such that, for reclosing said film package, the flap extension is capable of engaging in its tucked-in position at least one edge of said front wall opening, thereby to remain clamped underneath said front wall of said carton.

2. A reclosable film package according to claim 1, wherein said flap extension and said front wall opening both have a trapezoid shape.

3. A reclosable film package according to claim 1, wherein the length l' of said flap extension is at least equal to the length l of said flap.

4. A reclosable film package according to claim 3, wherein said length l' is at least three times as great as said length l.

5. A reclosable film package according to claim 1, wherein said flap extension has at least one crease allowing its inward folding to facilitate its tucking into the body of the carton.

6. A reclosable film package according to claim 1, wherein said flap extension has creases determining a base section of a size approximately equal to that of said flap and a top section of a larger size.

7. A reclosable film package according to claim 6, which is arranged in such a way that said top section of said flap extension starts to enter underneath the edges of said front wall opening as said flap takes a position lying in the plane of said rear wall and said base section of said flap extension is taking a position approximately normal thereto.

8. A reclosable film package according to claim 1, wherein the front wall opening is tapered widthwise from a top end of the front wall opening to a bottom end of the front wall opening, and wherein the flap extension is tapered widthwise from an edge hingedly connected to the flap to a bottom edge, wherein the taper of the flap extension is less than the taper of the front wall opening, thereby allowing progressive engagement of said flap extension with said front wall upon reclosing the film carton.

9. A reclosable film package according to claim 1, wherein said top portion of said front wall has a provision allowing its removal in at least two parts.

10. A reclosable film package according to claim 9, wherein said top portion has at the end edge an easily removable subsection providing a finger space facilitating the further removal of said top section from said front wall.

11. A reclosable film package according to claim 1, wherein said wrapper of said filmpack, is in the form of a bag.

12. A reclosable film package according to claim 1, wherein the length of said exit extension of said wrapper is greater than the height of said front wall opening so that said exit extension can be partially inserted in said carton.

13. A reclosable film package according to claim 1, wherein said flap extension is provided with adhesive means allowing said backfolded wrapper extension to become adhered to it thereby producing unfolding of said wrapper extension as the carton flap is opened.

14. A reclosable film package according to claim 1, wherein said carton has a weakened circumferential line allowing easy removal of its entire top portion.

* * * * *

UNITED STATES PATENT AND TRADEMARK OFFICE
CERTIFICATE OF CORRECTION

PATENT NO. : 5,924,571

DATED : July 20, 1999

INVENTOR(S) : Herman Cornelissen

It is certified that error appears in the above-identified patent and that said Letters Patent is hereby corrected as shown below:

Column 1, line 44, "Cornellissen" should read -- Cornelissen --;

Column 2, line 14, "onto" should read -- on --;

Column 6, line 59, "wrapper" should read -- exit --;

Column 6, line 60, "wrapper" should read -- exit --.

Signed and Sealed this

Fifth Day of December, 2000

Attest:

Q. TODD DICKINSON

Attesting Officer

*Director of Patents and Trademarks*